United States Patent
Anderson et al.

(10) Patent No.: US 12,475,488 B2
(45) Date of Patent: *Nov. 18, 2025

(54) GENERATING A COMPOSITE LISTING FOR A LODGING FACILITY

(71) Applicant: TravelPass Group, LLC, South Jordan, UT (US)

(72) Inventors: Joshua Bair Anderson, South Jordan, UT (US); Jason Wayne Stubbs, South Jordan, UT (US); Alan M. Feuerlein, South Jordan, UT (US)

(73) Assignee: TravelPass Group, LLC, South Jordan, UT (US)

( * ) Notice: Subject to any disclaimer, the term of this patent is extended or adjusted under 35 U.S.C. 154(b) by 220 days.

This patent is subject to a terminal disclaimer.

(21) Appl. No.: 18/483,183

(22) Filed: Oct. 9, 2023

(65) Prior Publication Data

US 2024/0232953 A1 Jul. 11, 2024

Related U.S. Application Data

(63) Continuation of application No. 17/712,845, filed on Apr. 4, 2022, now Pat. No. 11,783,380.

(51) Int. Cl.
*G06Q 30/0241* (2023.01)

(52) U.S. Cl.
CPC .............. *G06Q 30/0276* (2013.01)

(58) Field of Classification Search
CPC .......... G06Q 30/0276; G06Q 50/12
USPC ......... 705/14.72, 14.42, 14.54, 14.66, 14.69, 705/14.67; 709/246, 200, 204; 345/522; 706/14

See application file for complete search history.

(56) References Cited

U.S. PATENT DOCUMENTS

| | | | | |
|---|---|---|---|---|
| 10,706,452 | B1* | 7/2020 | Ghamsari | G06F 16/958 |
| 2002/0188507 | A1* | 12/2002 | Busche | G06Q 30/0269 |
| | | | | 705/14.42 |
| 2003/0023598 | A1* | 1/2003 | Janakiraman | G06Q 30/0273 |
| | | | | 705/14.69 |
| 2004/0003038 | A1* | 1/2004 | Huang | G06F 16/40 |
| | | | | 709/204 |
| 2004/0243664 | A1* | 12/2004 | Horstemeyer | G08G 1/20 |
| | | | | 709/200 |
| 2007/0027760 | A1* | 2/2007 | Collins | G06Q 30/0243 |
| | | | | 705/14.54 |

(Continued)

OTHER PUBLICATIONS

Nicole Kow, 4 types of accommodation providers you can partner with (and why), 2016 (Year: 2016).*

*Primary Examiner* — Tarek Elchanti
(74) *Attorney, Agent, or Firm* — Ray Quinney & Nebeker P.C.; Paul N. Taylor

(57) ABSTRACT

The present disclosure relates to systems, methods, and computer-readable media for selectively identifying lodging content from listings provided by different listing providers and generating a composite listing that includes content selected across the different providers. For example, systems described herein may include content selection models that are trained to select different content types from listings that are provided by different listing providers based on features of the content and/or users. The composite listing may enable a user to book a stay with a lodging facility based on content presented via different third-party content providers for the same facility.

17 Claims, 7 Drawing Sheets

(56) References Cited

U.S. PATENT DOCUMENTS

| | | | |
|---|---|---|---|
| 2007/0067493 A1* | 3/2007 | Issa | H04L 67/53 709/246 |
| 2007/0100688 A1* | 5/2007 | Book | G06Q 30/0271 705/14.67 |
| 2009/0276309 A1* | 11/2009 | Otto | G06Q 30/0255 706/14 |
| 2010/0076811 A1* | 3/2010 | Keller | G06Q 30/00 705/14.42 |
| 2011/0046970 A1* | 2/2011 | Fontenot | G16H 40/67 705/14.66 |
| 2011/0302025 A1* | 12/2011 | Hsiao | G06Q 30/0242 705/14.42 |
| 2012/0259702 A1* | 10/2012 | Zhang | G06Q 30/0254 705/14.54 |
| 2013/0321435 A1* | 12/2013 | Stevens, III | G06F 21/6209 345/522 |
| 2016/0180406 A1* | 6/2016 | Chauhan | G06Q 30/0276 705/14.66 |
| 2017/0193565 A1* | 7/2017 | Meyer | G06Q 30/0276 |
| 2018/0081975 A1* | 3/2018 | DiTomaso | G06F 16/901 |
| 2020/0201829 A1* | 6/2020 | Halstead | G06F 16/211 |

* cited by examiner

GENERATING A COMPOSITE LISTING FOR A LODGING FACILITY

CROSS-REFERENCE TO RELATED APPLICATIONS

This application is a continuation of U.S. patent application Ser. No. 17/712,845, filed Apr. 4, 2022, which is hereby incorporated by reference in its entirety.

BACKGROUND

Recent years have seen a rise in the use of computing devices to manage listings for various lodgings. Indeed, it is now common for customers to book travel arrangements remotely through computing systems online. For example, many third-party providers utilize server systems that collect listing information from any number of lodging facilities and present listings to customers via client devices of the customers. These third-party listings enable the customers to book with the lodging facilities through the third-party server systems. While third-party booking systems provide a convenient alternative to searching out and booking with individual lodging facilities, there exist a number of drawbacks and limitations with conventional online booking systems.

For example, many third-party listing providers fail to provide complete or accurate information with respect to one or more aspects of a lodging facility. For instance, one or more booking systems may fail to provide information about amenities for a particular lodging facility while other booking system(s) may fail to provide information about the surrounding area of the lodging facility. Indeed, because each listing provider is generally operated independently from one another, each of multiple providers may provide disparate levels of information and ultimately fail to provide useful information to a potential customer.

In addition to each third-party provider presenting different information, the third-party providers are frequently updating different information and details about the various lodging facilities as information becomes available. As a result, customers who revisit a particular third-party provider platform may experience confusion as a result of recent updates with respect to a particular lodging facility or be unable to track down a listing they may have otherwise been interested to book.

As mentioned above, because third-party listing services have become so popular, an increasing number of third-party listing providers are publishing listing information via a wide variety of platforms. As a result, the problem that third-party listings have attempted to address with respect to enabling a customer to view listings for multiple lodging facilities has become a similar problem with customers now visiting an increasing number of third-party platforms to gather important information from the respective listing providers. Indeed, because different listing providers provide different information, it is becoming increasingly common for customers to visit multiple third-party platforms to gather relevant information prior to booking a reservation for a particular lodging facility.

These and other problems exist in connection with providing listings for lodging facilities to a customer base.

DETAILED DESCRIPTION

Figure 1:
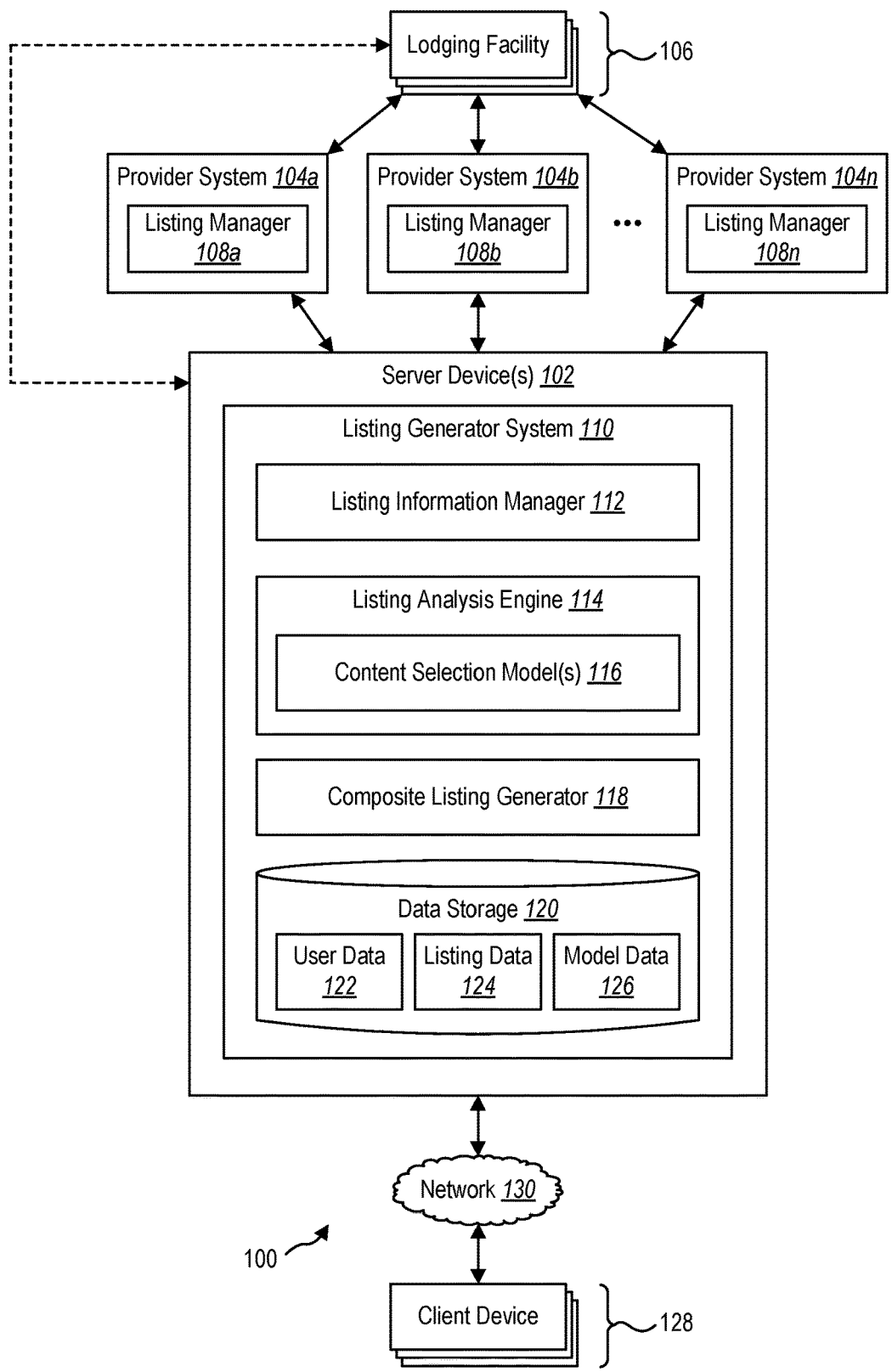
FIG. 1 illustrates an example environment including a listing generation system in accordance with one or more embodiments.

This disclosure relates to a listing generation system having features and functionality related to generating and presenting a composite listing for a lodging facility. In particular, as will be discussed in further detail herein, a listing generation system may receive, collect, or otherwise obtain listing information from a plurality of provider systems and selectively identify portions of content from the respective listings using one or more content selection models. The listing generation system may further create a composite listing for a lodging facility including the selectively identified portions of content based on various criteria discussed herein.

As an illustrative example, the listing generation system may obtain, from a first provider, a first listing for a lodging facility that includes lodging content provided by the first provider system. The listing generation system may further obtain, from a second provider, a second listing for the lodging facility that includes lodging content provided by the second provider system. The listing generation system may selectively identify portions of content from the respective listings based on a variety of factors and criteria discussed herein. The listing generation system may additionally generate a composite listing for the lodging facility that includes the identified portions of content associated with the lodging facility.

In one or more embodiments, the listing generation system may generate the composite listing in conjunction with receiving and processing a request for a listing. For example, in one or more embodiments, the listing generation system (or other system(s) described herein) may receive a request for a listing for one or more lodging facilities based on a set of criteria. Upon generating the composite listing, the listing generation system may provide a presentation of the composite listing via a graphical user interface of a client device. In one or more embodiments, the listing generation system may generate and/or present the composite listing based on features of the individual that provided the listing request. Moreover, in one or more embodiments, the listing generation system may obtain rate and availability information to include in conjunction with the composite listing generated by the listing generation system.

The present disclosure provides a number of practical applications that provide benefits and/or solve problems associated with generating and presenting listings for one or more lodging facilities. Examples of some of these practical applications and benefits will be discussed in further detail below.

For example, by analyzing and selective identifying content that is provided by multiple independent listing providers, the listing generation system may generate a listing that provides a more comprehensive depiction of rooms or other lodging arrangements for a lodging facility. For instance, where a first listing provider provides a comprehensive description of rooms while a second listing provider provides a comprehensive description of amenities, the listing generation system may generate a composite listing that includes both the first listing provider's description of the rooms and the second listing provider's description of the amenities. Other examples may involve selectively identifying discrete portions of listings across additional listing providers.

In addition to providing more comprehensive listings, the listing generation system can more effectively provide listings to end-users based on a wide variety of factors from the lodging content and/or characteristics of the potential customers. For example, in one or more embodiments described herein, the listing generation system applies one or more content selection models trained to consider various features of the content and/or user profiles to determine which combination of content will result in a more likely conversion rate. In addition, one or more embodiments described herein incorporate feedback received from the listing providers as well as users of client devices themselves to fine-tune or otherwise refine the training of the content selection models to provide comprehensive listings that improve in effectiveness over time.

In each of the above example, the listing generation system can provide composite listings without requiring that the listing providers share information with one another. Moreover, the listing generation system can provide the benefits described herein without indicating to a customer which of the provider systems have provided the respective portions of content. In one or more embodiments, the listing generation system provides the content associated with the listings without an indication of the content source, but may nonetheless provide pricing and availability information for the respective sources.

In one or more embodiments, the listing generation system enables a user to book a listing with a particular listing provider based on rate and availability data for the listing provider, even where one or more portions of the content for the listing are not provided by the particular listing provider. Indeed, in one or more implementations, the listing generation system may enable a booking where none of the content is provided by an associated listing provider.

As illustrated in the foregoing discussion, the present disclosure utilizes a variety of terms to describe features and advantages of one or more embodiments of the listing generation system described herein. For example, as used herein, a "lodging facility" may refer to one of a variety of facilities or locations where an individual or multiple individuals can book a stay for some period of time. By way of example and not limitation, lodging facilities may refer to hotels, condominiums, rentals, houses, mobile homes, resorts or any place where an individual may reside for some defined period of time.

As used herein, a "listing provider" or simply "provider" may refer to any platform that provides a mechanism whereby a user may view listing information and/or book a listing for a lodging facility. In one or more embodiments, a listing provider may refer to a third-party provider that interacts with lodging facilities to obtain availability and rate information and which provides a listing including information about the lodging facility and associated listings. A listing provider may provide any number of listings associated with any number of lodging facilities. In one or more embodiments, a listing provider may host a searchable platform that enables an individual to request listings based on input criteria and which may provide multiple listings associated with different lodging facilities simultaneously to a user.

As used herein, a "listing" may refer to a webpage or a document that is presentable via a graphical user interface and which includes information associated with a booking opportunity for a lodging facility. A listing may include listing information (described herein as listing and/or lodging content), which may include any content that describes a room, set of rooms, or other lodging arrangement that is offered by a lodging facility. In one or more embodiments, lodging content may include a variety of content types that are presented via a graphical user interface of a client device. For example, in one or more embodiments, lodging content includes textual content that describes some aspect of the listing. In addition, lodging content may include images, photos, or other multi-media content that a user may view to obtain additional information about a listing. In some implementations, a listing may include audio content or any other type of content that may be consumed by a user to obtain further information about a listing.

Additional detail will now be provided regarding a listing generation system in connection with examples illustrated in the figures. For example, FIG. 1, illustrates an example environment 100 including a plurality of devices and systems that enable customers to book a listing or otherwise make a reservation for one of a plurality of lodging facilities via a provider system. In particular, as shown in FIG. 1, the environment 100 includes one or more server device(s) 102 in communication with a plurality of provider systems 104a-n that provide access to listings with a plurality of lodging facilities 106. Consistent with one or more embodiments described above, the environment 100 may include any number of provider systems 104a-n that provide a capability to book a listing with any number of lodging facilities 106. In one or more embodiments, the lodging facilities 106 additionally provide the capability to book directly with a respective facility.

As shown in FIG. 1, each of the lodging facilities may include a respective listing manager 108a-n thereon. As will be discussed in further detail below, the listing managers 108a-n may provide listing information including a variety of information for various lodging facilities 106. For example, a first listing manager 108a may provide a listing including different types of content, such as text content, image content, video content, audio content, or any other type of content that provides information associated with a particular lodging facility. In one or more embodiments, the listing manager 108a may additionally provide rate and availability information within a listing. Each of the listing managers 108a-n may have similar features and functionality as one another, even where the provider systems 104a-n may provide listing information for non-identical sets of lodging facilities from the plurality of lodging facilities 106.

As further shown in FIG. 1, the server device(s) 102 may include a listing generation system 110 having a number of components and data thereon. For example, as shown in FIG. 1, the listing generation system 110 may include a listing information manager 112. The listing generation system 110 may additionally include a listing analysis engine 114 having one or more content selection models 116 thereon. The listing generation system 110 may further include a composite listing generator 118. As further shown, the listing generation system 110 may include or have access to a data storage 120 having various types of data thereon, such as user data 122, listing data 124, model data 126 and any other data that may be accessed or used by the respective components of the listing generation system 110.

As further shown in FIG. 1, the server device(s) 102 may communicate directly or indirectly with a plurality of client devices 128 via a network 130. While not shown in FIG. 1, the server device(s) 102 may similarly communicate with the provider system 104a-n and the lodging facilities 106 via the same or different network from the illustrated network 130 over which the server device(s) 102 and client devices 128 communicate.

The client devices 106 and other devices described herein (e.g., the server device(s) 102, provider systems 104a-n, lodging facilities 106) may refer to various types of computing devices. As an example, one or more of the client devices 106 may include a mobile device, such as a mobile telephone, a smartphone, a PDA, a tablet, or a laptop. One or more of the client devices 128 may similarly refer to server devices of a cloud computing system or other devices accessible to an end-user via a client-facing device. Indeed, the client device 130 may refer to any device capable of communicating with and accessing information provided by the listing generation system 110 in accordance with one or more embodiments described herein. Each of the client devices 128, server device(s) 102, provider systems 106, and lodging facilities may include or make use of any of the features and functionalities described below in connection with FIG. 6.

In addition, the network 130 may refer to one or multiple networks and may use one or more communication platforms or technologies for transmitting data. The network 130 may refer to any data link that enables transport of electronic data between devices and/or modules of the example environment 100 shown in FIG. 1. The network 130 may refer to a hardwired network (e.g., where a client accesses the database management system directly), a wireless network (e.g., where the client devices communicate with the server device(s) over a wireless network), or a combination of hardwired and wireless networks. In one or more embodiments, the network includes the Internet. In addition, as mentioned above, while the network 130 shown in FIG. 1 facilitates communication between the client devices 128 and the server device(s) 102, the network 130 may similarly facilitate communication between any of the components of the environment 100 shown in FIG. 1.

Additional information will now be discussed in connection with the listing generation system 110 and illustrated components. As mentioned above, the listing generation system 110 may generate listings for any number of lodging facilities 106 that list, publish, or otherwise provide access to listing information from one or more of the provider systems 104a-n. For example, in one or more embodiments described herein, the listing generation system 110 may selectively identify content from a first provider system 104a for a lodging facility and additional content from a second provider system 104b for the lodging facility to generate a composite listing that includes a combination of the content obtained from the two provider systems 104a-b. One or more embodiments described herein may involve selectively identifying content of various types from any number of the provider systems 104a-n in generating and presenting a composite listing to a user of a client device.

For example, as shown in FIG. 1, the listing generation system 110 may include a listing information manager 112. In one or more embodiments, the listing information manager 112 collects listing information from the various provider systems 104a-n. As noted above, the listing information may include different types of content such as text content, image content, video content, etc. In addition, and as will be discussed in further detail below, the listing information manager 112 can collect rate information and/or availability information to provide in conjunction with a composite listing generated by other components of the listing generation system 110.

In one or more embodiments, the listing information manager 112 collects different types of information from the various sources and, in many cases, may provide different types of information associated with respective facilities. For example, a first provider system 104a may provide a textual description of a lodging facility while a second provider system 104a provides a similar or different textual description in addition to a plurality of photos showing different views of the lodging facility. In another example, the first provider system 104a may provide both textual and photo content for a second lodging facility while the second provider system 104b provides only textual content (or no content at all) for the second lodging facility.

In one or more embodiments, the listing information manager 112 collects different listing information based on contracts or predetermined relationships between the listing generation system 110 and the individual provider systems 104a-n. For example, in one or more embodiments, the listing information manager 112 collects specific types of information based on an authorized relationship that allows access to exclusive rates (e.g., back-end rates, opaque rates, non-public rates) with a first provider system 104a, but may only receive public or front-end rates from a second provider system 104b. In addition to different types of information, the various provider systems 104a-n may provide information associated with different sets of lodging facilities, for example, based on established relationships or communications between the individual lodging facilities 106 and the respective provider systems 104a-n.

As mentioned above, the listing information may refer to different types of content (e.g., textual content, photo content, video content) that describes or illustrates various characteristics of the lodging facilities 106. In addition to these types of content that provide descriptive information about the various facilities, the listing information manager 112 may collect information related to availability and rates of particular listings. For example, the listing information manager 112 may query the respective provider systems 104a-n over periodic or frequent time intervals to collect current rate information and/or availability information. As rates and availability often change over time, the listing information manager 112 may receive and cause the information to be updated in accordance with one or more embodiments described herein.

As shown in FIG. 1, in addition to collecting information about the lodging facilities 106 from the provider systems 108a-n, in one or more embodiments, the listing information manager 112 may collect information from the lodging facilities 106 themselves. For example, in one or more embodiments, the listing information manager 112 may receive listing information from the provider systems 104a-n while receiving rate and availability information from the lodging facilities 106. Conversely, the listing information manager 112 may receive listing information from the lodging facilities 106 while receiving rate and/or availability information from one or more of the provider systems 104a-n. In one or more embodiments, the listing information manager 112 may receive some subset of listing information and/or availability and rate information from a combination of the lodging facilities 106 and provider systems 104*a-n*

As mentioned above, and as shown in FIG. 1, the listing generation system 110 may include a listing analysis engine 114 having a content selection model(s) 116 implemented thereon. Upon collecting the listing information, the listing analysis engine 114 can apply one or more content selection model(s) 116 to the listing information to selectively identify portions of content obtained from the various provider systems 104*a-n* (and/or the lodging facilities 106) based on a variety of criteria. In one or more embodiments, the listing analysis engine 114 selects the portions of listing information based on training of one or more content selection model(s) 116.

As used herein, a content selection model may refer to a computer-implemented algorithm or model (e.g., a classification model, regression model, language model, image analysis model, detection model) that can be tuned (e.g., trained) based on training input to approximate unknown functions. For example, a content selection model may refer to a machine learning model that includes a neural network or other machine learning algorithm or architecture that learns and approximates complex functions to generate outputs based on one or more inputs provided to the machine learning model. In one or more embodiments, a content selection model 116 refers to multiple discrete models that have been trained based on different training data to approximate different functions.

As an illustrative example, the content selection model 116 may refer to a machine learning model that is trained to identify an image from a set of images that would optimize a listing in some way. For example, in one or more embodiments, the content selection model 116 may be trained to select an image based on an approximation of what an administrator of the listing generation system 110 would select given a similar set of input images. In one or more embodiments, the content selection model 116 is trained to select an image based on a predicted conversion rate of a listing that includes the image.

In other examples, the content selection model 116 may be trained to identify other types of content from the listing information that would optimize the listing in some way. For example, the content selection model(s) 116 may be applied to textual content, or specific portions of textual content (e.g., room description, amenity description, facility description, etc.) to identify portions of the textual content that would optimize a composite listing. In one or more embodiments, the listing analysis engine 114 can apply any number of models to different types of content to determine portions of the various types of content that may be used in generating a composite listing. In one or more embodiments, the listing analysis engine 114 utilizes a model for each type of listing information. Additional information in connection with applying the content selection model(s) 116 will be discussed below.

In one or more embodiments, the listing analysis engine 114 may utilize models that are trained to selectively identify content particular to one or more users. For example, while one or more embodiments described herein refer specifically to models that are trained to identify content independent of a specific user that the content will be presented, in one or more implementations, the listing analysis engine 114 may consider features of the user and/or client device. For example, in one or more embodiments, the listing analysis engine 114 may make use of content selection model(s) 116 that have been trained based on parameters that include characteristics of various users. In one or more embodiments, the listing analysis engine 114 may use a model that has been trained for a particular user or group of users.

As mentioned above, and as shown in FIG. 1, the listing generation system 110 may further include a composite listing generator 118. Upon selectively identifying portions of content from the listing information, the composite listing generator 118 may generate a composite listing for one or more lodging facilities 106 based on the selected content. For example, in one or more embodiments, the composite listing generator 118 may generate a listing that includes selected portions of listing information from one or more of the provider systems 104*a-n* and/or lodging facilities 106.

As an example, the composite listing generator 118 can generate a composite listing that includes a first portion of content obtained from the first provider system 104*a* and a second portion of content obtained from the second provider system 104*b*. Each portion may be associated with the same lodging facility. In one or more embodiments, the respective portions may refer to selected types of listing information selected by the listing analysis engine 114. For example, a first portion may refer to a first text portion based on text content being provided by the first provider system 106*a* being selected over text content being provided by the second provider system 106*b* (and other provider systems). Conversely, the second portion may refer to a first image (or set of images) based on the image content being provided by the second provider system 106 being selected over image content being provided by the first provider system 106*a* (and other provider systems). In one or more embodiments, portions of listing information provided by a lodging facility may be selected over (or in addition to) content provided by the provider systems 104*a-n*.

The composite listing generator 118 can generate the composite listing in a number of ways. For example, in one or more embodiments, the composite listing generator 118 may select and list the identified portions of content via a graphical user interface presentable on a client device. In one or more embodiments, the composite listing generator 118 provides the identified portions of content to a client device or other system having an application that is configured to generate a composite listing. In one or more embodiments, the composite listing generator 118 obtains a listing template and populates fields of the listing template with the identified portions of lodging content. Additional information in connection with example implementations will be discussed in further detail below.

As shown in FIG. 1, the listing generation system 110 may include a data storage 120 having various types of data stored thereon. For example, the data storage 120 may include user data 122. The user data 122 may include any information associated with a user of a client device. For example, the user data 122 may include profile data, account data, or any information about the user that the user provides to the listing generation system 110. In one or more embodiments, the user data 122 includes web activity data, transaction data, purchase data, or any other data that the listing generation system 110 may use in selectively identifying content for the user. As noted above, the listing analysis engine 114 may consider user data 122 in selectively identifying content to include within a composite listing.

As further shown in FIG. 1, the data storage 120 may include listing data 124. The listing data 124 may include any information associating with a listing and/or lodging facility. For example, the listing data 124 may refer to any listing information obtained from a provider system 104*a-n* and/or lodging facilities 106. In one or more embodiments, the listing information may refer to information about the respective provider systems 104a-n and/or lodging facilities 106 themselves. In one or more embodiments, the listing data 124 may include conversion data or other information that would be helpful in associating various portions of types of lodging content with conversions or booking transactions.

As further shown in FIG. 1, the data storage 120 may include model data 126. The model data 126 may include any information associated with the content selection model(s) 116 used by the listing generation system 110 in selectively identifying content to include within a composite listing. As noted above, the model data 126 may include data for multiple machine learning models trained to identify content of different content types. In one or more embodiments, the model data 126 may include parameters associated with weights or algorithms employed by the respective models when making content selection decisions.

Figure 2:
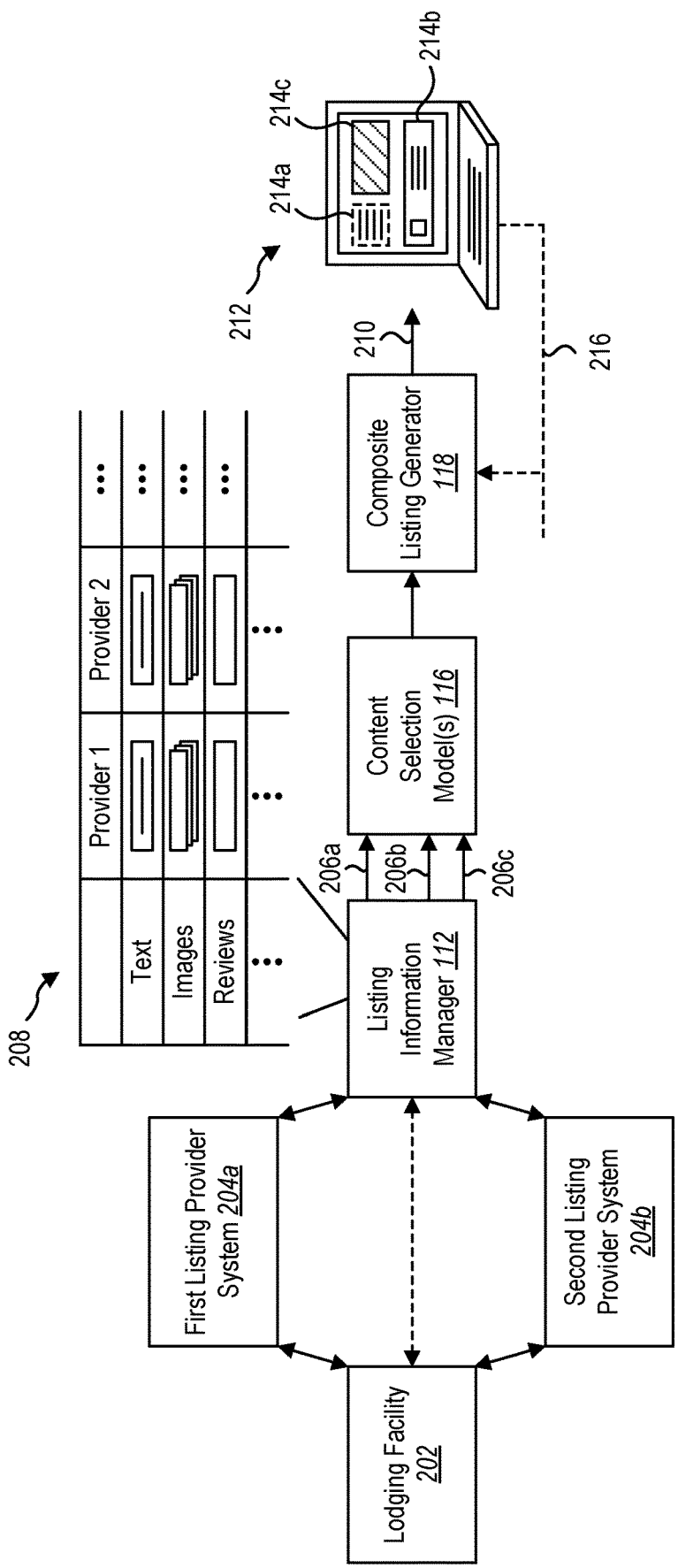
FIG. 2 illustrates an example workflow for implementing the listing generation system to generate and present a composite listing in accordance with one or more embodiments.

Additional detail will now be discussed in connection with an example workflow that may be performed by the listing generation system 110 in accordance with one or more embodiments. For example, FIG. 2 illustrates an example workflow 200 showing an example implementation in which listing information associated with an example lodging facility 202 is collected by a first listing provider 204a and a second listing provider 204b and provided to a listing generation system 110 having features and functionality described above in connection with FIG. 1. It will be appreciated that the lodging facility 202 and the listing providers 204a-b may have similar features as similar components discussed above in connection with FIG. 1. Moreover, it will be appreciated that while FIG. 2 illustrates an example implementation in which lodging information from a single lodging provider 202 and two listing providers 204a-b is used to generate a composite listing, other implementations may include additional facilities and/or provider systems.

As shown in FIG. 2 and as discussed above, a listing information manager 112 may request, collect, access, or otherwise obtain listing information associated with the lodging provider 202. For example, in one or more embodiments, the listing information manager 112 may obtain lodging content for a first listing from the first listing provider 204a. The listing information manager 112 may further obtain lodging content for a second listing from the second listing provider 204b. The listings may refer to any listing associated with the lodging facility 202. In one or more embodiments, the listing information manager 112 may receive listing information directly from the lodging facility 202.

As noted above, the listing information obtained from the respective sources may differ from one another. For example, a first listing from the first listing provider 204a may include a comprehensive textual description of the rooms, amenities, or other associated features of the lodging facility 202 in addition to a set of stock photos showing generic rooms and/or amenities. In contrast, the second listing from the second listing provider 204b may include a stock description of the room and/or amenities, but may include a collection of high quality photos, videos, or other displayable content captured for the specific lodging facility 202. In one or more embodiments, the listing information manager 112 may additionally collect listing information from the lodging facility 202.

As shown in FIG. 2, the listing information manager 112 may provide different types of content to a content analysis model 116 for further evaluation. By way of example, the listing information manager 112 may provide a first content type 206a, a second content type 206b, and a third content type 206c to the content analysis model(s) 116. Consistent with other implementations described herein, the content types 206a-c may refer to different types of lodging content, such as textual content, image content, video content, etc. In one or more embodiments, the content types 206a-c may refer to content associated with different features of the lodging facility 202. For example, the content types 206a-c may refer to content associated with rooms, content associated with amenities, content associated with the surrounding area, or other types of information. In one or more embodiments, the content types 206a-c may refer to different sources of content, such as content obtained by the respective providers 204a-b from social media, blog posts, third-party websites, self-generated content (e.g., by the respective listing providers 204a-b), etc.

The listing information manager 112 may identify and provide the respective content types 206a-c in a variety of ways. As an example, in one or more embodiments, the listing information manager 112 may maintain a listing content record 208 including a compilation of lodging content obtained from the various sources. Further, as shown in FIG. 2, the listing content record 208 may include the content organized by content types.

As an illustrative example, the listing content record 208 may include content organized in rows and columns based on source of the content (e.g., listing provider, lodging facility) and content types. As shown in FIG. 2, the listing content record 208 may include a first row showing portions of textual content obtained from each of the respective listing providers 204a-b. The listing content record 208 may include a second row showing portions of photographic content obtained from each of the respective listing providers 204a-b. The listing content record 208 may include a third row showing portions of review content obtained from each of the respective listing providers 204a-b. Any number of rows and columns may be included to include a wide variety of content-types and associated sources. In some implementations, a particular cell may be blank based on a listing provider not providing a specific type of content.

In one or more embodiments, the content analysis model(s) 116 is applied to the listing record 208 to selectively identify portions of content from the listing record 208 that should be used to generate a composite listing. As mentioned above, the content analysis model(s) 116 may refer to a single model or multiple models that have been trained to selectively identify lodging content from a set of lodging content provided to the content analysis model(s) 116. In one or more embodiments, the content analysis model(s) 116 identifies portions of content corresponding to different content types that are predicted to optimize the composite listing. For example, the content analysis model(s) 116 may identify a column from each row to selectively identify content to include within the composite listing.

While FIG. 2 illustrates an example including a single content analysis model 116, other implementations may include multiple models. For example, in one or more embodiments, the content analysis model(s) 116 includes a first model trained to evaluate and select a first type of content (e.g., textual content). The content analysis model(s) 116 may further include a second model trained to evaluate and select a second type of content (e.g., image content). In one or more embodiments, the content analysis model(s) 116 may include a third model trained to evaluate and select content including one or more user reviews for a lodging facility. Other implementations may include discrete models trained to selectively identify different content-types.

While the content analysis model(s) 116 may include models that are discretely trained to selectively identify different content types, in one or more embodiments, the content analysis model(s) 116 may include different models that are trained to identify content based on a characteristics of a user. For example, where a user is a frequent user or a business traveler, the content analysis model(s) 116 may identify different content than a recreational traveler or an infrequent user. Thus, in one or more embodiments, the content analysis model(s) 116 may implement a first model (or first set of models) trained to identify content for a first type of user and a second model (or second set of models) trained to identify content for a second type of user.

As shown in FIG. 2, the content analysis model(s) 116 may generate an output indicating a selection of content to be included within a composite listing. The content analysis model(s) 116 may provide the output including the identified portions of content to the composite listing generator 118. The composite listing generator 118 may generate and provide composite lodging content 210 to a client device 212.

The composite listing generator 118 may provide the composite lodging content 210 to the client device 212 in a variety of ways. In one or more embodiments, the composite listing generator 118 provides the identified content to the client device 212 to locally generate a composite listing on the client device 212. For example, in one or more embodiments, the client device 212 may include a listing application configured to generate a composite listing on the client device 212. In one or more embodiments, the composite listing generator 118 generates the composite listing for presentation via a webpage or remote service provided by the listing generation system 110.

As mentioned above, in one or more embodiments, the composite listing generator 118 may populate a listing template including fields associated with different content types. In the example shown in FIG. 2, the composite listing generator 118 may populate a first template field with first content 214a including textual content descriptive of one or more features of the lodging facility. As further shown, the composite listing generator 118 may populate a second template field with second content 214b including reviews or blog content from a third-party source. As further shown, the composite listing generator 118 may populate a third template field with third content 214c including image or video content associated with the lodging facility.

As mentioned above, and as will be discussed in further detail below, in one or more embodiments, the composite listing generator 118 may receive feedback data 216 from the client device 212 that may be used to refine or fine-tune the content analysis model(s) 116. For example, in one or more embodiments, the feedback data 216 may refer to conversion data indicating whether a user books a listing from the composite listing presented. In one or more embodiments, the feedback data 216 includes user feedback indicating portions of the composite listing that the user liked or found helpful. Additional information in connection with refining or otherwise retraining the content analysis model(s) 116 will be discussed below in connection with FIGS. 3A-3B.

While not shown in FIG. 2, the listing generation system 110 may selectively identify and include similar types of content within composite listings that originate from different sources. For example, in one or more embodiments, the listing generation system 110 selects different portions of textual content from different listing providers. For instance, text content describing a pool, beach, or other feature of the lodging facility 202 may be selected from the first listing provider 204a while textual content describing the room(s) or a hotel restaurant may be selected from a second listing provider 204b. As will be discussed in an example below, different photos may be selected from different sources.

Content may be selected based on characteristics of the listing information. For example, image content may be selected based on objects or displayed content within the content itself or based on metadata of the digital content itself. For example, in one or more embodiments, the listing generation system 110 selects lodging content based on objects that are detected within the image. In one or more embodiments, the listing generation system 110 selects content based on colors or brightness of an image. In one or more embodiments, the listing generation system 110 selects lodging content based on brightness of an image. In one or more embodiments, the listing generation system 110 selects content based on resolution or a metric of clarify of the image (e.g., selecting a highest resolution image).

In one or more embodiments, listing photos (or other multi-media) may be selected from different sources based on the types of photos. For example, in one or more embodiments, a listing content record 208 may include rows for respective types of images. For instance, a first row of the listing content record 208 may include photos of rooms, a second row of the listing content record 208 may include photos of a pool, and a third row of the listing content record 208 may include photos of a bathroom. The listing generation system 110 may selectively identify a room photo, pool photo, and/or a bathroom photo from across multiple provider systems to include within the composite listing. In one or more embodiments, the listing generation system 110 may populate template fields for a composite listing template based on the fields being tagged with respective image types.

In one or more embodiments, the listing generation system 110 may identify lodging content based on different types of client devices. For example, the listing generation system 110 may selectively identify content based on the client device being a mobile device based on the mobile device having a different displayable area and different content (or perhaps less content) providing a more optimized listing when presented on a mobile device. Alternatively, where a client device is a desktop or laptop with a larger graphical user interface, different content may be displayed based on the larger displayable area being associated with the type of client device.

As mentioned above, the listing generation system 110 may include one or more content selection models trained to selectively identify content based on a variety of criteria. As further discussed, one or more embodiments of the listing generation system 110 involve training and retraining the content selection models based on feedback received from various sources.

Figure 3A:
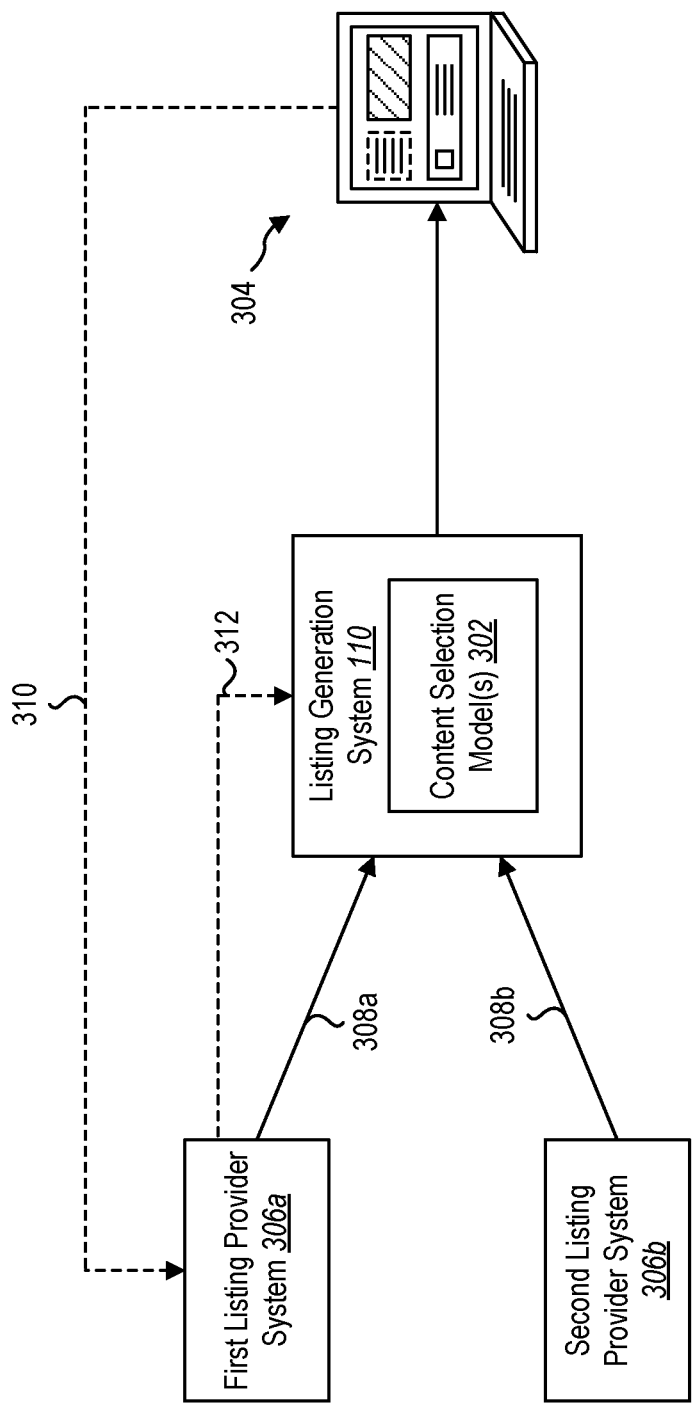
FIGS. 3A-3B illustrate example workflows for training and refining a content selection model on a listing generation system in accordance with one or more embodiments.
Figure 3B:
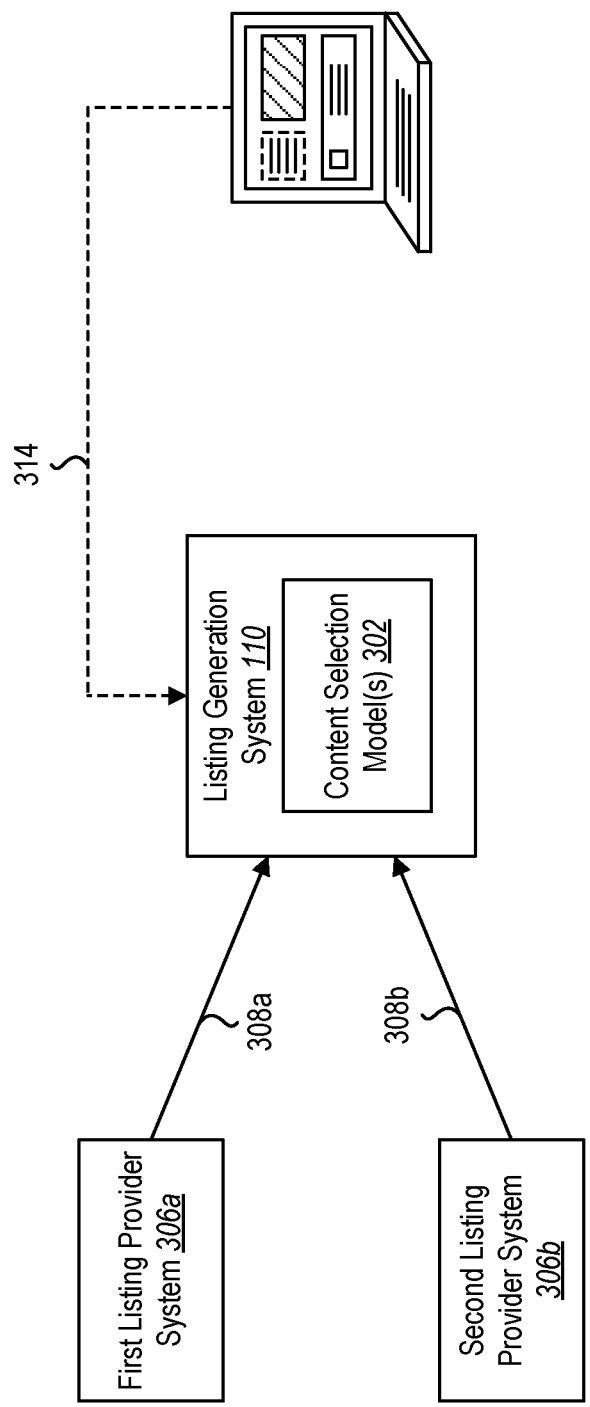

For example, FIGS. 3A-3B illustrates example implementations showing a content selection model 302 implemented on a listing generation system 110 having similar features and characteristics associated with content selection model(s) discussed above in connection with FIGS. 1-2. As shown in FIGS. 3A-3B, the listing generation system 110 can generate and provide a presentation of a composite listing to a client device 304. More specifically, as shown in FIGS. 3A-3B, the listing generation system 110 can obtain first content 308a from a first listing provider 306a and second content 308b from a second listing provider 306b, apply the content selection model 302 to the obtained contents 308a-b, and generate a composite listing including selectively identified content from the different listing systems 306a-b.

FIG. 3A shows a first implementation in which feedback is received and incorporated into training the content selection model 302 in accordance with one or more embodiments. For example, as shown in FIG. 3A, the client device 304 may provide a conversion indication 310 to a first listing provider 306a based on the client device 304 booking a listing from the rate and/or availability data originating from the first listing provider 306a. In this example, while the lodging content may be selected from across the listing providers 306a-b, the rate and/or availability may be selected from the first listing provider 306a.

In this example, the conversion indication 310 may be provided to the first listing provider 306a to facilitate booking with the first listing provider 306a (e.g., where the listing generation system 110 is not the entity that executes the listing). In one or more embodiments, the conversion indication 310 is provided to the listing generation system 110, which can provide the conversion information to the respective listing providers 306a-b. In one or more embodiments, the conversion indication 310 is provided to both the listing providers 306a-b.

In one or more embodiments, feedback data 312 is provided to the listing generation system 110 to use in connection with training the content selection model 302. For example, where the listing generation system 110 does not make or execute a booking, the feedback data 312 may be relayed from the first listing provider 306a to the listing generation system 110, which the listing generation system 110 can use to further train the content selection model 302. This feedback data 312 may include an indication of conversion of a listing and further indicate the specific content or content types associated with the converted listing.

FIG. 3B illustrates another example in which feedback data 314 is provided to the listing generation system 110 directly from the client device 304. For example, in one or more embodiments, the feedback data 314 may include an indication of content that was particularly helpful to a user of the client device 304 in deciding to book a stay with a lodging facility. For instance, the client device 304 may provide a survey or selectable icon asking a user to select whether a particular feature of the composite listing was helpful or unhelpful in determining whether to book a stay with the lodging facility. The feedback data 314 may be provided to the listing generation system 110, which may be used to further train or refine algorithms of the content selection model 302.

Figure 4:
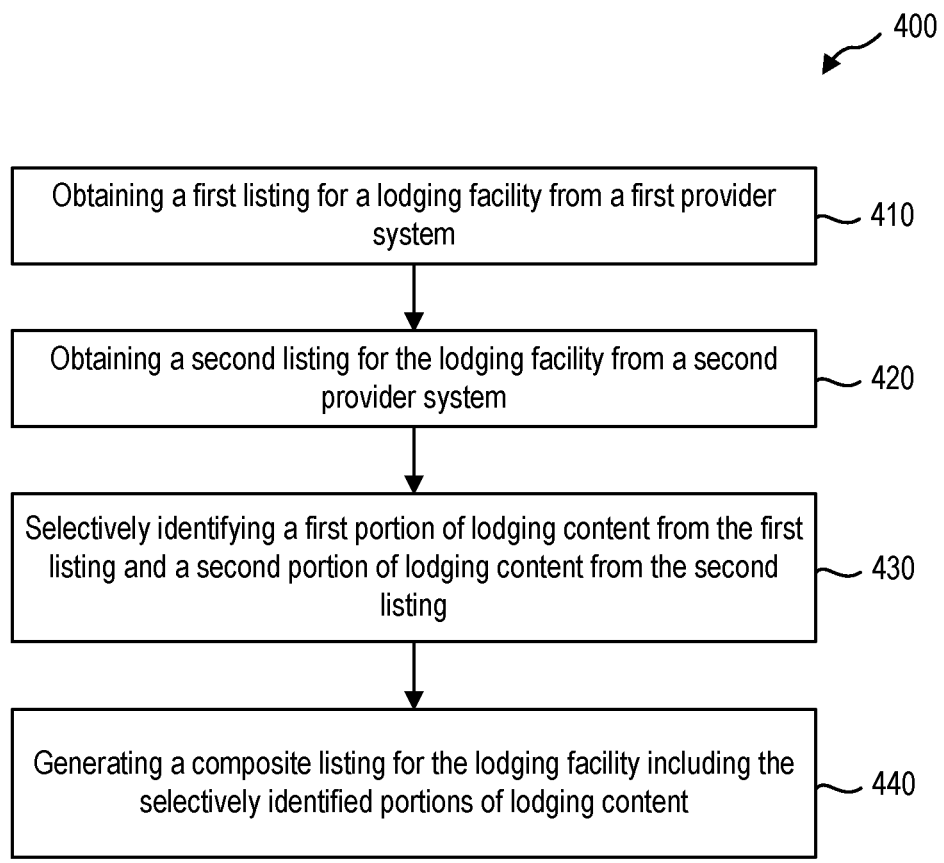
FIG. 4 illustrates an example series of acts related to generating a composite listing for a lodging facility in accordance with one or more embodiments.
Figure 5:
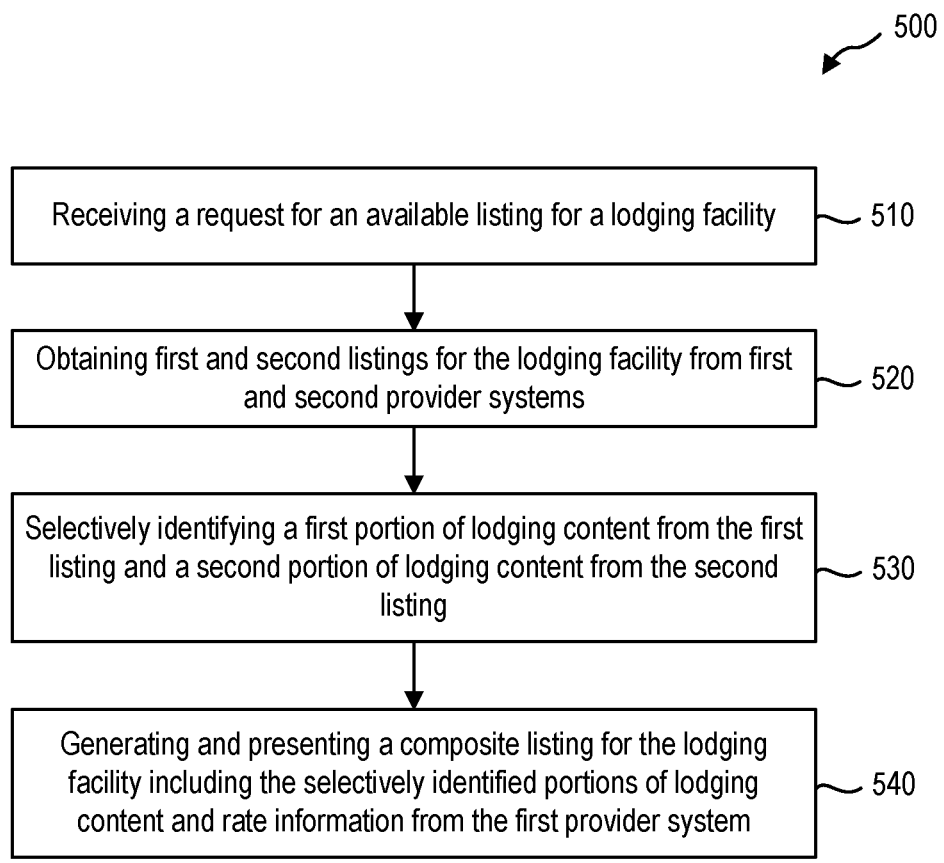
FIG. 5 illustrates an example series of acts related to processing a listing request and presenting a composite listing for a lodging facility in accordance with one or more embodiments.

Turning now to FIGS. 4-5, these figures illustrate example flowcharts including a series of acts for generating a composite listing and presenting the composite via a graphical user interface of a client device. While FIGS. 4-5 illustrate acts according to one or more embodiments, alternative embodiments may omit, add to, reorder, and/or modify any of the acts shown in FIGS. 4-5. The acts of FIGS. 4-5 can be performed as part of a method. Alternatively, a non-transitory computer-readable medium can include instructions that, when executed by one or more processors, cause a computing device to perform the acts of FIGS. 4-5. In still further embodiments, a system can perform the acts of FIGS. 4-5.

FIG. 4 illustrates an example series of acts 400 for generating a composite listing. As shown in FIG. 4, the series of acts 400 may include an act 410 of obtaining a first listing for a lodging facility from a first provider system. In one or more embodiments, the act 410 involves obtaining, from a first provider system, a first listing for a lodging facility, the first listing including lodging content provided by the first provider system.

As further shown in FIG. 4, the series of acts 400 may include an act 420 of obtaining a second listing for the lodging facility from a second provider system. For example, in one or more embodiments, the act 420 involves obtaining, from a second provider system, a second listing for the lodging facility, the second listing including lodging content provided by the second provider system.

As further shown in FIG. 4, the series of acts 400 may include an act 430 of selectively identifying a first portion of lodging content from the first listing and a second portion of lodging content from the second listing. In one or more embodiments, the act 430 may involve selectively identifying a first portion of the lodging content from the first listing for the lodging facility and a second portion of the lodging content from the second listing for the lodging facility.

As further shown in FIG. 4, the series of acts 400 may include an act 440 of generating a composite listing for the lodging facility including the selectively identified portions of lodging content. For example, in one or more embodiments, the act 440 may involve generating a composite listing for the lodging facility including the first portion of the lodging content and the second portion of the lodging content.

In one or more embodiments, the first provider system is a first multi-lodging provider system that provides listing information for a first plurality of lodging facilities. Further, in one or more embodiments, the second provider system is a second multi-lodging provider system that provides listing information for a second plurality of lodging facilities. In one or more implementations, the lodging facility is included in the first plurality of lodging facilities and the second plurality of lodging facilities.

In one or more embodiments, selectively identifying the first portion of the lodging content from the first listing for the lodging facility and the second portion of the lodging content from the second listing for the lodging facility includes applying a text-based content selection model to text portions of the first listing and the second listing to identify text from the first listing to include within the composite listing. Further, in one or more embodiments, selectively identifying the first portion of the lodging content from the first listing for the lodging facility and the second portion of the lodging content from the second listing for the lodging facility includes applying an image-based content selection model to image portions of the first listing and the second listing to identify text from the second listing to include within the composite listing.

In one or more embodiments, each of the text-based content selection model and the image-based content selection model is trained to selectively identify lodging content based on a predicted conversion rate of the composite listing including the selected portions of content. Further, in one or more embodiments, one or more of the text-based content selection model and the image-based content selection model are trained to selectively identify respective types of lodging content based on supervised feedback received from client devices on which the composite listings are presented.

In one or more embodiments, generating the composite listing includes identifying a listing template including fields associated with different content types for a given composite listing. Generating the composite listing may further include populating a first field of the listing template with the first portion of the lodging content and populating a second field of the listing template with the second portion of the lodging content.

In one or more embodiments, the first lodging content and the second lodging content include a plurality of images associated with the lodging facility. Further, in one or more embodiments, selectively identifying the content may include identifying a first one or more digital images from the first listing and a second one or more digital images from the second listing to include within the composite listing.

In one or more embodiments, selectively identifying the first portion of the lodging content from the first listing for the lodging facility and the second portion of the lodging content from the second listing for the lodging facility includes applying an image selection model to the plurality of images to selectively identify a subset of images to include within the composite listing. The image selection model may be trained to identify one or more images from a set of images based on visual characteristics of the one or more images, the visual characteristics including one or more of resolution of the one or more images, clarity of content displayed within the one or more images, and brightness characteristics of the one or more images.

In one or more embodiments, generating the composite listing includes identifying a listing template including fields associated with different views of a given listing for the lodging facility. Generating the composite listing may further include identifying, for each field associated with a respective view, an image from the plurality of images and populating the fields of the listing template with the identified image for each field.

In one or more embodiments, the series of acts 400 may further include maintaining a content database for the lodging facility, the content database including categorized lodging content from the first listing and the second listing. Further, in one or more embodiments, selectively identifying the first portion of the lodging content from the first listing for the lodging facility and the second portion of the lodging content from the second listing for the lodging facility includes selectively identifying rows of content from respective columns of the content database to include within the composite listing.

In one or more embodiments, the series of acts 400 may include receiving first rate and availability information for the first listing from the first listing provider and receiving second rate and availability information for the second listing from the second listing provider. The series of acts 400 may further include identifying one of the first rate and availability information and the second rate and availability information to include within the composite listing. In one or more embodiments, the series of acts 400 includes receiving an indication that one of the first listing or the second listing was booked by a user of a client device and updating one or more algorithms of a model used to selectively identify the first portion of the lodging content and the second portion of the lodging content.

FIG. 5 illustrates an example series of acts 500 for generating and presenting a composite listing in accordance with one or more embodiments described herein. As shown in FIG. 5, the series of acts 500 may include an act 510 of receiving a request for an available listing for a lodging facility. In one or more embodiments, the act 510 involves an act performed by a computer that includes receiving a request for an available listing for a lodging facility.

As further shown, the series of acts 500 may include an act 520 of obtaining first and second listings for the lodging facility from first and second provider systems. For example, in one or more embodiments, the act 520 may involve obtaining, from a first provider system, a first listing for the lodging facility, the first listing including lodging content provided by the first provider system and obtaining, from a second provider system, a second listing for the lodging facility, the second listing including lodging content provided by the second provider system.

As further shown, the series of acts 500 may include an act 530 of selectively identifying a first portion of lodging content from the first listing and a second portion of lodging content from the second listing. For example, in one or more embodiments, the act 530 may involve selectively identifying a first portion of the lodging content from the first listing for the lodging facility and a second portion of the lodging content from the second listing for the lodging facility.

As further shown, the series of acts 500 may include an act 540 of generating and presenting a composite listing for the lodging facility including the selectively identifying portions of lodging content and rate information from the first provider system. For example, in one or more embodiments, the act 540 may involve generating a composite listing for the lodging facility including the first portion of the lodging content, the second portion of the lodging content, and rate information from the first provider system and presenting, via a graphical user interface on a client device and responsive to the request for the available listing, the composite listing for the lodging facility.

In one or more embodiments, selectively identifying the first portion of the lodging content from the first listing for the lodging facility and the second portion of the lodging content from the second listing for the lodging facility includes applying a text-based content selection model to text portions of the first listing and the second listing to identify text from the first listing to include within the composite listing. In addition, in one or more embodiments, selectively identifying the first portion of the lodging content from the first listing for the lodging facility and the second portion of the lodging content from the second listing for the lodging facility includes applying an image-based content selection model to image portions of the first listing and the second listing to identify text from the second listing to include within the composite listing.

Figure 6:
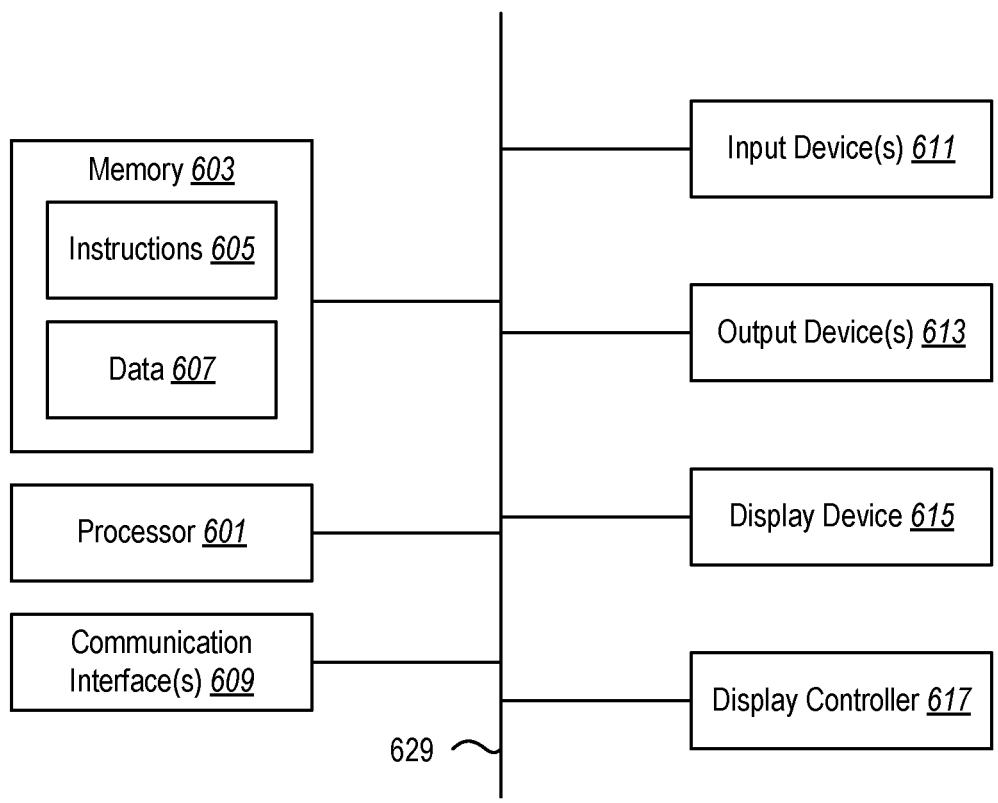
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with a Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method, comprising:
obtaining, by a computing device from a first provider system, a first listing for a lodging facility, the first listing including lodging content provided by the first provider system;
obtaining, by the computing device from a second provider system, a second listing for the lodging facility, the second listing including lodging content provided by the second provider system;
selectively identifying, by the computing device, a first portion of the lodging content from the first listing for the lodging facility and a second portion of the lodging content from the second listing for the lodging facility to include within a composite listing for the lodging facility, wherein selectively identifying the first portion and second portion of the lodging content includes:
applying a first machine learning model to images from the first listing and the second listing, the first machine learning model being trained to selectively identify image content of a first type; and
applying a second machine learning model to images from the first listing and the second listing, the second machine learning model being trained to selectively identify image content of a second type, wherein one or more of the first machine learning model and the second machine learning are trained to selectively identify image content to be included in an output listing based on a predicted conversion rate of the output listing including the selectively identified image content;
generating, by the computing device, a composite listing for the lodging facility including one or more images of the first portion of the lodging content and the second portion of the lodging content, the first portion of the lodging content including one or more images of the first type and the second portion of the lodging content including one or more images of the second type, wherein generating the composite listing includes:
identifying a listing template including fields associated with different views of a given listing for the lodging facility;
identifying, for each field associated with a respective view, an image from the plurality of images; and
populating the fields of the listing template with the identified image for each field; and
presenting, via a graphical user interface on a client device and responsive to a request for an available listing, the composite listing for the lodging facility.

2. The computer-implemented method of claim 1,
wherein the first provider system is a first multi-lodging provider system that provides listing information for a first plurality of lodging facilities, and
wherein the second provider system is a second multi-lodging provider system that provides listing information for a second plurality of lodging facilities, wherein the lodging facility is included in the first plurality of lodging facilities and the second plurality of lodging facilities.

3. The computer-implemented method of claim 1, wherein one or more of the first machine learning model and the second machine learning model are trained to selectively identify respective types of image content to include within composite listings based on supervised feedback received from client devices on which the composite listings are presented.

4. The computer-implemented method of claim 1, wherein generating the composite listing includes:
identifying a listing template including fields associated with different types of image content a given composite listing;
populating a first field of the listing template with the first portion of the lodging content; and
populating a second field of the listing template with the second portion of the lodging content.

5. The computer-implemented method of claim 1, wherein the composite listing includes first lodging content and the second lodging content include a plurality of images associated with the lodging facility, the of images including a first one or more images of the first type and a second one or more images of the second type.

6. The computer-implemented method of claim 1, wherein one or both of the first machine learning model and the second machine learning model are trained to selectively identify image content based on visual characteristics of the images from the first listing and the second listing, the visual characteristics including one or more of:
resolution of the one or more images;
clarity of content displayed within the one or more images; and
brightness characteristics of the one or more images.

7. The computer-implemented method of claim 1, further comprising maintaining a content database for the lodging facility, the content database including categorized lodging content from the first listing and the second listing, and wherein selectively identifying the first portion of the lodging content from the first listing for the lodging facility and the second portion of the lodging content from the second listing for the lodging facility includes selectively identifying rows of content from respective columns of the content database to include within the composite listing.

8. The computer-implemented method of claim 1, further comprising:
receiving first rate and availability information for the first listing from the first listing provider;
receiving second rate and availability information for the second listing from the second listing provider; and
identifying one of the first rate and availability information and the second rate and availability information to include within the composite listing.

9. The computer-implemented method of claim 8, further comprising:
receiving an indication that one of the first listing or the second listing was booked by a user of a client device; and
updating one or more algorithms of the first machine learning model and the second machine learning model used in selectively identifying image content of the first type and the second type, respectively.

10. A system, comprising:
at least one processor;
memory in electronic communication with the at least one processor; and
instructions stored in the memory, the instructions being executable by the at least one processor to:
obtain, from a first provider system, a first listing for a lodging facility, the first listing including lodging content provided by the first provider system;
obtain, from a second provider system, a second listing for the lodging facility, the second listing including lodging content provided by the second provider system;
selectively identify a first portion of the lodging content from the first listing for the lodging facility and a second portion of the lodging content from the second listing for the lodging facility to include within a composite listing for the lodging facility, wherein selectively identifying the first portion and second portion of the lodging content includes:
applying a first machine learning model to images from the first listing and the second listing, the first machine learning model being trained to selectively identify image content of a first type; and
applying a second machine learning model to images from the first listing and the second listing, the second machine learning model being trained to selectively identify image content of a second type, wherein one or more of the first machine learning model and the second machine learning are trained to selectively identify image content to be included in an output listing based on a predicted conversion rate of the output listing including the selectively identified image content;
generate a composite listing for the lodging facility including one or more images of the first portion of the lodging content and the second portion of the lodging content, the first portion of the lodging content including one or more images of the first type and the second portion of the lodging content including one or more images of the second type, wherein generating the composite listing includes:
identifying a listing template including fields associated with different views of a given listing for the lodging facility:
identifying, for each field associated with a respective view, an image from the plurality of images; and
populating the fields of the listing template with the identified image for each field; and cause a client device to present, via a graphical user interface on the client device and responsive to a request for an available listing, the composite listing for the lodging facility.

11. The system of claim 10,
wherein the first provider system is a first multi-lodging provider system that provides listing information for a first plurality of lodging facilities, and
wherein the second provider system is a second multi-lodging provider system that provides listing information for a second plurality of lodging facilities, wherein the lodging facility is included in the first plurality of lodging facilities and the second plurality of lodging facilities.

12. The system of claim 10, wherein generating the composite listing includes:
identifying a listing template including fields associated with different types of image content a given composite listing;
populating a first field of the listing template with the first portion of the lodging content; and
populating a second field of the listing template with the second portion of the lodging content.

13. The system of claim 10, wherein one or both of the first machine learning model and the second machine learning model are trained to selectively identify image content based on visual characteristics of the images from the first listing and the second listing, the visual characteristics including one or more of:
resolution of the one or more images;
clarity of content displayed within the one or more images; and
brightness characteristics of the one or more images.

14. The system of claim 10, further comprising instructions being executable by the at least one processor to maintain a content database for the lodging facility, the content database including categorized lodging content from the first listing and the second listing, and wherein selectively identifying the first portion of the lodging content from the first listing for the lodging facility and the second portion of the lodging content from the second listing for the lodging facility includes selectively identifying rows of content from respective columns of the content database to include within the composite listing.

15. The system of claim 10, further comprising instructions being executable by the at least one processor to:
receive first rate and availability information for the first listing from the first listing provider;
receive second rate and availability information for the second listing from the second listing provider; and
identify one of the first rate and availability information and the second rate and availability information to include within the composite listing.

16. A non-transitory computer readable storage medium having instructions stored thereon that, when executed by at least one processor, causes a computing device to:

obtain, from a first provider system, a first listing for a lodging facility, the first listing including lodging content provided by the first provider system;
obtain, from a second provider system, a second listing for the lodging facility, the second listing including lodging content provided by the second provider system;
selectively identify a first portion of the lodging content from the first listing for the lodging facility and a second portion of the lodging content from the second listing for the lodging facility to include within a composite listing for the lodging facility, wherein selectively identifying the first portion and second portion of the lodging content includes:
applying a first machine learning model to images from the first listing and the second listing, the first machine learning model being trained to selectively identify image content of a first type; and
applying a second machine learning model to images from the first listing and the second listing, the second machine learning model being trained to selectively identify image content of a second type, wherein one or more of the first machine learning model and the second machine learning are trained to selectively identify image content to be included in an output listing based on a predicted conversion rate of the output listing including the selectively identified image content;
generate a composite listing for the lodging facility including one or more images of the first portion of the lodging content and the second portion of the lodging content, the first portion of the lodging content including one or more images of the first type and the second portion of the lodging content including one or more images of the second type, wherein generating the composite listing includes:
identifying a listing template including fields associated with different views of a given listing for the lodging facility;
identifying, for each field associated with a respective view, an image from the plurality of images; and
populating the fields of the listing template with the identified image for each field; and
cause a client device to present, via a graphical user interface on the client device and responsive to a request for an available listing, the composite listing for the lodging facility.

17. The non-transitory computer readable storage medium of claim 16, wherein generating the composite listing includes:
identifying a listing template including fields associated with different types of image content a given composite listing;
populating a first field of the listing template with the first portion of the lodging content; and
populating a second field of the listing template with the second portion of the lodging content.

* * * * *